United States Patent

[11] 3,561,541

| [72] | Inventor | Roger W. Woelfel<br>3780 S. Woelfel Road, New Berlin, Wis. 53151 |
|---|---|---|
| [21] | Appl. No. | 669,497 |
| [22] | Filed | Sept. 21, 1967 |
| [45] | Patented | Feb. 9, 1971 |

[54] TRACTOR AND IMPLEMENT HYDRAULIC CONTROL SYSTEM
13 Claims, 4 Drawing Figs.

[52] U.S. Cl. .................................................. 172/265, 172/710; 91/443
[51] Int. Cl. .................................................. A01b 61/04
[50] Field of Search .......................................... 172/261, 264, 265, 705; 60/710, 657, 51, 52HE; 91/443, 446, 448

[56] References Cited
UNITED STATES PATENTS

| 3,481,407 | 12/1969 | Arnold et al. | 172/285 |
| 2,968,282 | 1/1961 | Hayman et al. | 91/443X |
| 3,113,432 | 12/1963 | Watson | 91/446X |
| 3,135,529 | 6/1964 | Conrad | 60/52(H.E)X |
| 3,172,481 | 3/1965 | Trollsas | 172/261 |
| 3,247,867 | 4/1966 | Martin | 91/443X |
| 3,321,031 | 5/1967 | Evans | 172/261X |
| 3,349,855 | 10/1967 | Knudson | 172/261 |
| 3,416,611 | 12/1968 | Fischer | 172/261 |

FOREIGN PATENTS

| 130,722 | 9/1959 | U.S.S.R. | 172/261 |

*Primary Examiner*—Robert E. Pulfrey
*Assistant Examiner*—Alan E. Kopecki
*Attorney*—Wheeler, Wheeler, House and Clemency

ABSTRACT: Disclosed herein are hydraulic circuits for controlling hydraulic cylinders utilized on agricultural implements to afford tripping and resetting of the earth working tools. The circuits are provided with means for maintaining suitable working pressures in the cylinders. In one embodiment an adjustable pressure responsive electrical switch is used. In another embodiment an adjustable pressure responsive unloading valve is provided. Check valves in the circuits seal the desired pressure in the hydraulic cylinders and pressure relief valves permit discharge of fluid from the cylinders into a reservoir as the working tools trip. The circuits also include fluid accumulators which can be selectively connected to function as shock absorbers to absorb surges in pressure or disconnected to increase the resistance of the circuit to tripping of the working tools.

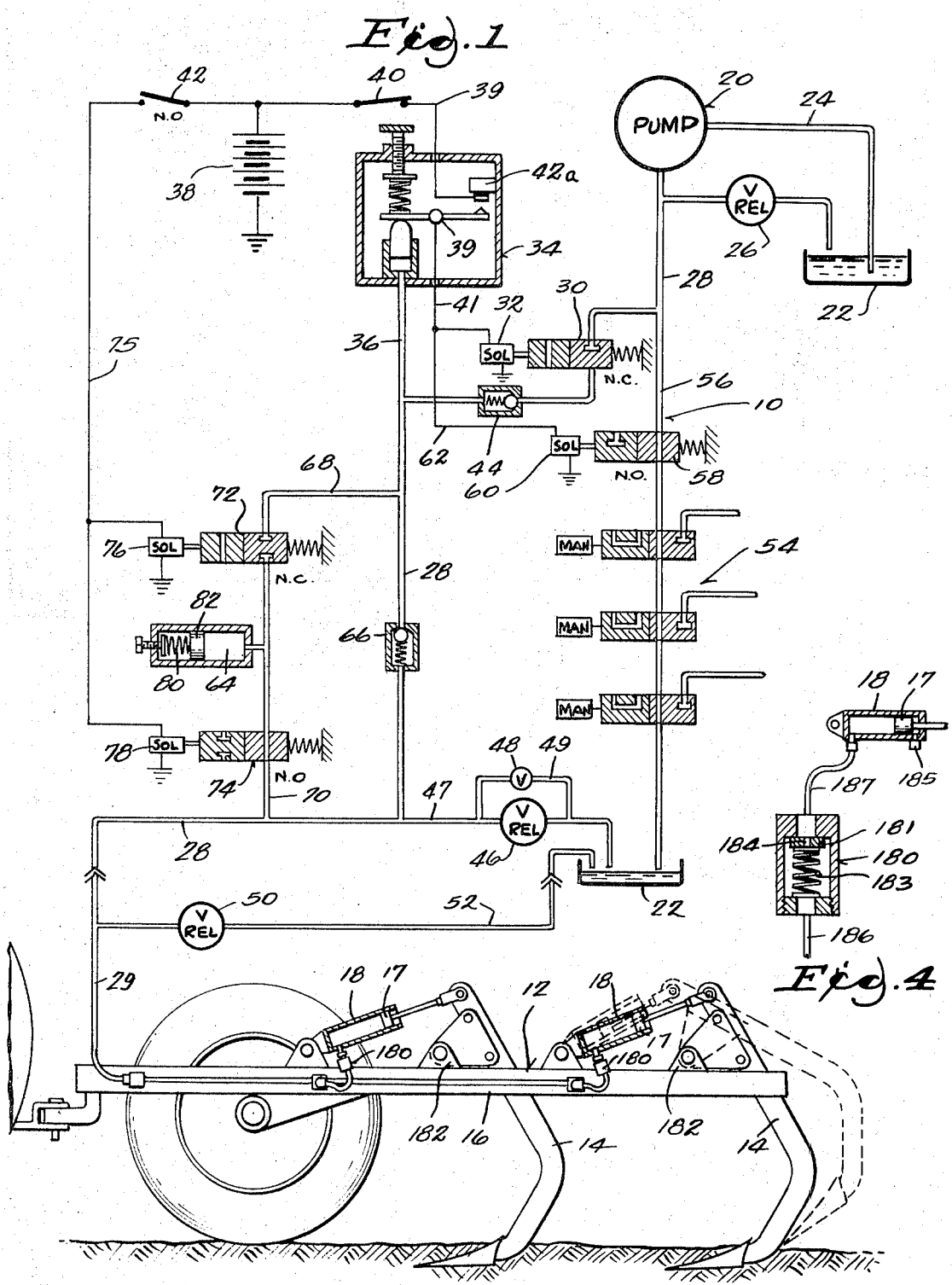

TRACTOR AND IMPLEMENT HYDRAULIC CONTROL SYSTEM

BACKGROUND OF INVENTION

The invention relates to agricultural implements of the type provided with hydraulic cylinders which are connected to the working tools to afford tripping of the tool as the tool encounters an obstacle and resetting of the tool as the obstacle is passed. Many forms of plows of this type have been devised but they generally have proved inadequate or ineffective to cope with the wide variety of soil conditions encountered. With severe draft loads during plowing, continual tripping of the earth working tools occurs if the pressures in the circuit cannot be maintained at sufficient levels to afford resistance to movement of the pistons or rams in the hydraulic cylinders. This can result in delays and uneven plowing. With some prior art implement circuits, the operator has to leave the tractor and connect the hydraulic circuit on the implement to the hydraulic pump on the tractor for recharging of the cylinders due to loss of fluid upon tripping of the working tools.

Furthermore, difficulties have occurred with prior art hydraulic systems in maintaining pressure in all the cylinders sufficient to prevent the tools or plow bottoms from shallowing out and not penetrating at the desired depth. These problems are due, in part, to the lack of provision in the hydraulic systems utilized for adjusting the pressure in the cylinders to appropriate levels for the differing soil and plowing conditions.

SUMMARY OF INVENTION

The invention contemplates a hydraulic circuit with provisions to vary the working pressure in hydraulic cylinders on agricultural implements utilized to control tripping and resetting of the earth working tools. With the hydraulic circuits of the invention, the working pressure in the cylinders can be set at appropriate levels for the particular soil conditions or plowing conditions by the operator without leaving the tractor. In one embodiment, an adjustable pressure sensitive electrical switch connected to the circuit by a pilot line will energize a solenoid controlled valve to permit fluid flow into the hydraulic cylinders when the pressure in the cylinders drops below a predetermined value and thus restores the working pressure in the cylinders and returns the working tools to their operative position.

In an additional embodiment the selected or desired working pressure for the hydraulic cylinders is controlled by an unloading valve which has a pilot line connected to the fluid supply conduit connecting the pump and the hydraulic cylinders. Upon loss of pressure in the hydraulic cylinders, as for instance when the working tools trip and discharge fluid through a pressure relief valve into the sump, the unloading valve will sense the drop in pressure and close a bypass route resulting in recharging of the pressure in the cylinders to the desired load level.

The invention also provides an accumulator which can be selectively connected to the circuit to perform different functions. In normal plowing conditions the accumulator is connected to function as a shock absorber to receive surges in pressure as the working tools are tripped and avoid loss of fluid through the pressure relief valve adjacent the hydraulic cylinders and into the sump. Under severe plowing conditions the accumulator is easily disconnected from the discharge side of a check valve and connected to the intake side of a check valve by closing an electrical switch. When connected in this manner the resistance of the circuit to tripping of the working tools is increased and the working tools will not trip until the pressure in the circuit reaches the level at which an adjustable pressure relief valve is set, thus eliminating constant tripping and shallowing of the working tools when extreme draft loads or pressures are encountered.

The use of an adjustable pressure responsive pump which will recharge the working pressures in the hydraulic cylinders to a predetermined level is within the purview of the invention.

Further objects and advantages of the present invention will become apparent from the following disclosure.

DRAWINGS

FIG. 1 is a schematic and diagrammatic view of the open circuit hydraulic control circuit in accordance with the invention, connected to a farm implement.

FIG. 4 is a sectional view of a flow restrictor.

DETAILED DESCRIPTION

Figure 3:
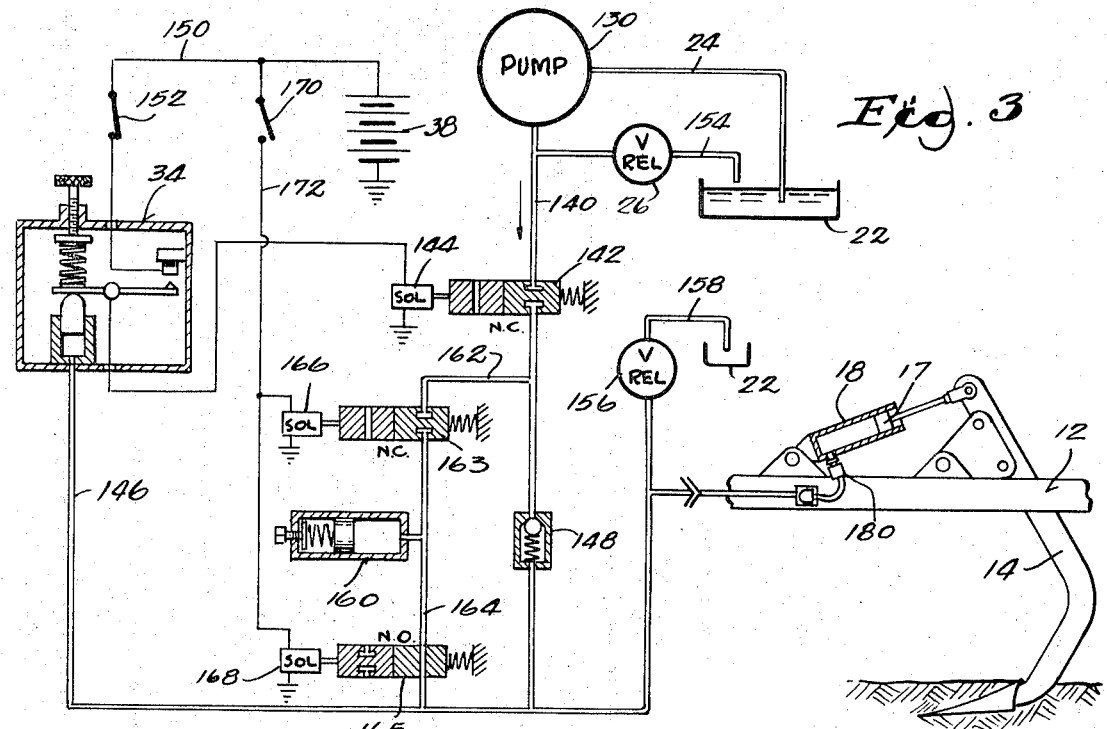
FIG. 3 is a schematic and diagrammatic view of a closed circuit hydraulic control system in accordance with the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, there is shown a hydraulic control circuit which is designated generally 10 and which is shown connected to a typical farm implement 12 which has multiple earth working tools 14. The working tools 14 are pivotally connected to a frame 16 with one end of each tool connected to the piston 17 of the hydraulic cylinder 18 which permits tripping of the working tools to protect the tool as obstacles and severe draft pressures are encountered and restoring or resetting of the tool as the obstacle is cleared.

The hydraulic control system or circuit 10 includes a fluid or hydraulic pump 20 connected to a fluid sump or reservoir 22 by a conduit 24. The pump 20 can be the conventional pump located on the tractor and driven by the tractor engine. The circuit conventionally includes an adjustable pressure relief valve 26 which affords discharge of fluid into the reservoir 22 when a predetermined pressure is attained for protection of the pump 20.

Hydraulic fluid is supplied to the hydraulic cylinders 18 through fluid passage means or supply conduit 28 which is detachably connected to a manifold line 29 which is located on the implement 16 and which supplies all the hydraulic cylinders 18 on the implement.

To vary the working pressure in the hydraulic cylinders 18 to appropriate levels for the soil conditions encountered, the circuit is provided with means responsive to pressure in the conduit 28 for controlling fluid flow through conduit 28. In the disclosed construction in FIG. 1 such means comprises a valve 30 which is biased to a normally closed position and which is actuated by a solenoid coil 32 which is normally deenergized. The means also includes a pressure sensitive electrical switch which has a pilot conduit 36 connected to the conduit 28. The pressure responsive switch 34 is connected to an electrical circuit including a battery 38 by a lead 39 and a switch 40 which is normally closed during operation of the tractor and associated implement 12. The switch 34 is connected to coil 32 by a lead 41. When switch 40 is closed, switch 34 will close and energize coil 32 to open valve 30 to afford hydraulic fluid flow through conduit 28 until the sensed pressure through conduit 36 reaches the setting at which the pressure switch 34 has been adjusted. When this pressure has been attained, the contacts 42A in the pressure switch will open and deenergize solenoid 32 permitting the valve 30 to close under spring biasing. When valve 30 is closed, a check valve 44 in conduit 28 will prevent fluid loss through valve 30 and maintain the adjusted pressure in the cylinders 18. When the valve 30 is opened the ball in valve 44 will unseat to permit fluid flow in conduit 28.

The circuit illustrated in FIG. 1 also includes an adjustable pressure relief valve 46 located on the tractor which communicates with the supply conduit 28 by a branch conduit 47 and which communicates with the reservoir or sump 22. A hand operated valve 48 and a bypass conduit 49 permit release of pressure in the cylinders 18 to manually raise the tools 14 to facilitate adjustment of the tools, plow bottoms, etc. If the implement is provided with a pressure relief valve 50, valve 46 can be eliminated. The valve 50 discharges into the sump 22 through a conduit 52.

In operation, with the circuit as thus far described, as one or more working tools encounter severe draft pressures or obstructions and trip, the pressure will increase in supply conduit 28 until the setting of the pressure relief valve 46 or 50 is attained and hydraulic fluid is discharged into the sump 22.

Upon loss of fluid into the sump 22 the pressure switch 34 will sense the loss in pressure in conduit 28 through pilot conduit 36 and switch 34 will energize solenoid 32 to open valve 30 and thus restore the pressure in the cylinders 18 and reset the working tools in their operative position. Both the pressure switch 34 and the pressure relief valve 46 can be located for easy adjustment by the operator to obtain optimum performance of the implement with shallowing of the working tools minimized and loss of fluid through the valve 46 kept to a negligible amount to eliminate constant recharging of the circuit by the pump.

The accessory valve bank 54 is supplied with hydraulic fluid through conduit 56 which communicates with the reservoir 22. Flow through conduit 56 is controlled by a valve 58 which is biased to a normally open position and operated by a solenoid coil 60 which is connected to the pressure switch by a lead 62. The valve 58 is normally open during tractor operation permitting continuous circulation of fluid from the pump 20 to the reservoir 22, and is closed when the pressure in conduit 28 falls below the pressure at which the switch 34 is set and the hydraulic cylinders 18 are charged. When this occurs, valve 58 will be closed and the valve 30 opened for flow through conduit 28.

To absorb pressure surges and minimize constant recharging of the cylinders 18, the circuit 10 can include an adjustable fluid accumulator 64 and a check valve 66. The accumulator 64 is connected to conduit 28 by a branch conduit 68 which is connected to the pump side or intake side of a one-way valve or check valve 66 and connected to the discharge side of valve 66 by conduit 70. Flow through conduits 68 and 70 is controlled by valves 72 and 74 which can be solenoid actuated. Valve 72 is biased to a normally closed position and valve 74 is biased to a normally open position. The solenoid coils 76 and 78 are energized by closing a switch 42 desirably located within reach of the tractor or tow vehicle operator, and in a lead 75.

During normal operating conditions for the working tools 14, switch 42 and valve 74 will be open and valve 72 closed and the accumulator 64 will function as a shock absorber to receive surges in pressure as one or more working tools are tripped as they engage obstacles or encounter slightly higher than normal draft pressures. Spring 80 will yield to relieve pressure in the circuit and then will bias the piston 82 in the accumulator 64 to restore the pressure in cylinders 18 upon release of the tools 14 from the obstructions.

When the vehicle operator anticipates higher than normal draft pressures, as for instance when plowing in red clay or matted alfalfa beds, the operator will close the switch 42 thereby energizing solenoids 76 and 78 to open valve 72 and close valve 74, thus connecting the accumulator 64 to the supply line 28 on the intake side of check valve 66 and removing the accumulator from the circuit as a shock absorber. This provides increased resistance of the circuit to tripping of the working tools with excessive draft pressures. The circuit is protected by pressure relief valves 50 or 46. Pressure relief valve 46 may typically be set for release upon rise in pressure in conduit 28 to 2200 pounds per square inch. In one or more of the working tools encounters draft pressures which raise the pressure instantly in the supply line 28 to 2200 pounds, fluid will discharge through the pressure relief valve 46 into the reservoir 22. The accumulator 64 under these circumstances, and with switch 42 closed, will serve as a reservoir which will immediately supply additional fluid to the supply line 28 and cylinders 18 through check valve 66 upon loss of fluid through the relief valve 46 or 50.

With the release of fluid and consequent loss of pressure in conduit 28, the pressure switch 34 through the pilot tube 36 will sense the loss of pressure and open valve 30 and close valve 58 and supply additional fluid to the accumulator 64. Thus, the accumulator 64 when connected to the pump side of check valve 66 serves as a storage vessel for hydraulic fluid and minimizes constant opening and closing of valves 30 and 58 for recharging of the cylinders 18.

Figure 2:
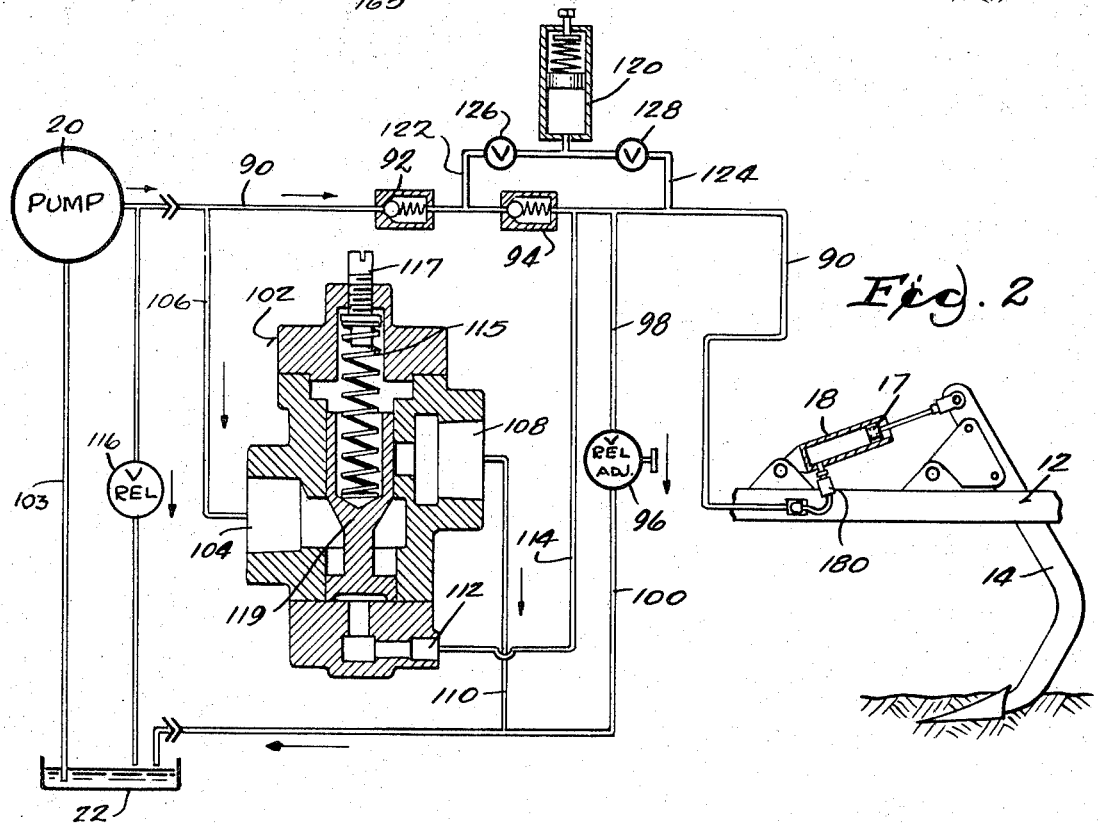
FIG. 2 is a schematic and diagrammatic view of the open circuit hydraulic control system in accordance with the invention.

Referring to FIG. 2, a further embodiment of the hydraulic control system of the invention is disclosed. The pump 20 communicates with a reservoir 22 through a passage 103 and supplies hydraulic fluid to cylinder 18 through the supply conduit 90. This circuit also includes check valves or one-way valves 92 and 94 in conduit 90 and an adjustable pressure relief valve 96 connected to conduit 90 by a branch conduit 98 and to the reservoir 22 by a conduit 100.

In the circuit disclosed in FIG. 2 the means responsive to pressure in conduit 90 to maintain the desired working pressures in the cylinders 18 comprises an adjustable unloading valve 102. The unloading valve 102 has an inlet port 104 connected to conduit 90 by a branch conduit 106 and an outlet 108 connected to the reservoir 22 by a bypass conduit 110. The unloading valve 102 also includes a pilot inlet 112 which is connected to supply line 90 on the discharge side of one-way valve 94 by a pilot conduit 114. As in the first embodiment, the pump is protected by a pressure relief valve 116.

In operation of the circuit illustrated in FIG. 2 as thus far described, the unloading valve is in a closed condition as shown until the cylinders 18 are charged to the desired working pressure by fluid flow through supply conduit 90 into cylinders 18. When the pressure in line 90 reaches the working pressure at which the unloading valve 102 is set by adjustment of screw 117, the pressure will be sensed through pilot conduit 114 and the unloading valve plunger 119 will open against spring biasing of spring 115 to permit fluid communication between inlet 104 and outlet 108 and thus continuous fluid flow from supply conduit 90 through the unloading valve through conduit 110 and into sump 22 and thus an open circuit through the unloading valve 102 with no flow to the cylinders 18.

Upon tripping of the working tools 14 and a surge of pressure in supply conduit 90 on the discharge side of valve 94, valve 96 will open and permit release of pressure and fluid through conduit 100 into reservoir 22. The loss of pressure in cylinder 18 will be sensed by unloading valve 102 through pilot conduit 114 and the plunger or piston 119 in the unloading valve 102 will close and permit fluid flow through the conduit 90 through check valves 92 and 94 into cylinder 18 to restore the working pressure in the cylinder 18.

As with the circuit shown in FIG. 1, the circuit illustrated in FIG. 2 can also include an adjustable accumulator 120 which is connected to conduit 90 on the discharge side of check valve 94 by a conduit 124 and on the intake side of the valve 94 by a conduit 122. Flow through conduits 122 and 124 is controlled by valves 126 and 128 which can be manual or solenoid operated as hereinabove described. Valve 128 is normally open during routine cultivating or plowing operations and thus accumulator 120 functions as a shock absorber and reservoir to receive surges in line pressure as the working tools 14 trip.

To prevent displacement of the working tools from the desired operating position when encountering severe draft pressures, valve 128 is closed and valve 126 which is normally closed is opened to connect the accumulator 120 on the intake side of valve 94 and remove the accumulator as a shock absorber. With the valves in these positions, the check valve 94 will prevent pressure loss into the accumulator. The implement can then function without displacement or shallowing of the working tools. When the pressure at which the adjustable relief valve 96 is set is attained, fluid will be discharged through the valve 96 and into the reservoir 22 through the conduit 100. Upon loss of fluid, the accumulator 120 will restore pressure and fluid in the cylinders 18 as hereinabove described. In the event that the fluid loss through the relief valve 96 is substantial and the accumulator cannot fully restore the pressure in the cylinders 18, the unloading valve 102 will close and the pump will supply fluid to both the accumulator and cylinders 18 through the conduit 90.

Referring to FIG. 3, a closed circuit system is disclosed embodying the features of the invention. As with the circuit illustrated in FIG. 1, there is included a pump 130 which is provided with internal pressure regulating means to control pressure output of the pump. The circuit also includes a conduit 24 communicating with a sump 22, a pressure relief valve 26 for protecting the pump and a supply conduit 140 which connects the pump 130 with the hydraulic cylinders 18 on the implement 12. Flow through conduit 140 is controlled by valve 142 which is spring biased to a normally closed position and which is operated by a solenoid coil 144. The solenoid coil 144 is energized by an adjustable pressure switch 34 which has a pilot line 146 communicating with conduit 140 on the discharge side of check valve 148. The switch 34 is connected to a battery 38 by a lead 150 through a switch 152.

In operation of the circuit disclosed in FIG. 3, the hydraulic cylinder 18 will be charged with the pressure at which switch 34 is set. When this pressure is attained, the valve 142 will be closed maintaining the desired pressure in cylinder 18. When switch 142 closes the pressure in conduit 140 on the pump side of valve 142 will be maintained at a predetermined level by the internal pressure regulating means in the pump 130. The one-way valve 148 seals the desired working pressure in the cylinders 18.

Upon tripping of the working tools 14 in the circuit illustrated in FIG. 3 as thus far described, the pressure relief valve 156 will afford discharge of fluid through conduit 158 into reservoir 22. With a drop in pressure in conduit 140 upon loss of fluid through the pressure relief valve 156, the pressure drop will be sensed through conduit 146 by the pressure switch 34 and solenoid 144 will be energized to open valve 142 and restore the working tools 14 to the operative position with the desired pressure in the cylinders 18.

As with other embodiments of my hydraulic control circuits, the circuit illustrated in FIG. 3 can be provided with an accumulator 160 which is connected to conduit 140 by branch conduits 162 and 164. Conduits 162 and 164 are selectively opened and closed by solenoids 166 and 168 which are energized by battery 38 upon closing the normally open switch 170 which is connected to the solenoid coils 166 and 168 by a lead 172. In normal operation, the switch 170 is open, valve 165 is open and valve 163 is closed. The accumulator 160 thus functions as a shock absorber to absorb surges in pressure as the working tools 14 encounter increased draft pressures and obstacles. With the switch 170 closed and the valve 163 opened and the valve 165 closed, the circuit will afford increased resistance to tripping of the working tools and the accumulator 160 will function as a fluid reservoir for restoring pressure and fluid to cylinder 18 to compensate for the fluid loss through pressure relief valve 156 into the reservoir.

The invention contemplates the use of adjustable pressure regulating devices to maintain appropriate working pressures in the hydraulic cylinders. The pressure regulating devices are within reach of the operator to facilitate adjustment as the plowing conditions vary.

As shown in FIG. 1, each of the hydraulic cylinders is provided with fluid flow restrictor means 180 connected to the manifold line 29 and the hydraulic cylinders 18. The restrictor means 18, as illustrated in FIG. 4, is in the form of a check valve having an intake side and a discharge side with a passage or aperture 184 through the check member 181. The check member is biased by a spring 183. The restrictor means 180 affords greater resistance to flow toward the hydraulic cylinders than from the cylinder 18. Thus, the fluid restrictor means slows the rate of flow of fluid into the cylinders to minimize wear in the connections between the working tools and the implement frame as the tools are restored to its operative position. The restrictor means 180 are particularly desirable for use with plows. When plowing, if a first plow bottom trips upon striking an obstruction and before the first plow bottom is restored to its operative position and second and third bottoms trip, the pressure created in the hydraulic cylinders connected to the second and third plow bottoms will create a surge of pressure in manifold 29 and the cylinder connected to the first plow bottom which could snap the first plow bottom and damage the connections 182. The restrictor means will prevent the return of the piston at a high rate of speed which can cause damage to the plow.

In the alternative the fluid restrictor can be connected to the air inlet 185 of the hydraulic cylinders 18. Referring to FIG. 4, the line 186 of the restrictor 180 would be connected to the air inlet 185 and the line 187 disconnected from the cylinder. The restrictor would thus retard movement of the piston 17 as it returns to its operative position.

Although the hydraulic cylinders shown in the drawings are utilized to control earth working tools, the circuit of the invention can be used with any hydraulic cylinders on an implement or tractor which are used to yieldably bias cooperative elements on the tractor or implement.

I claim:

1. The combination of a tractor having fluid pumping means and a fluid reservoir in communication with said pumping means, and an implement carrying an earth working tool with a hydraulic cylinder connected to said implement and said working tool to afford tripping of said working tool from its operative position upon increase in the draft pressure and to afford resetting of the tool upon decrease in the draft pressure on the tool, a hydraulic circuit including fluid passage means connecting said fluid pumping means to said hydraulic cylinder, adjustable pressure responsive valve means in said fluid passage between said pump and said cylinder for controlling fluid flow through said passage to maintain a selected working pressure in said hydraulic cylinder, said valve means closing said passage to prevent flow from said pump to said cylinder when said selected working pressure is attained in said cylinder, and pressure relief valve means communicating with said fluid reservoir to afford fluid flow into said reservoir and tripping of said working tool as the pressure in said hydraulic cylinder increases and attains a predetermined level upon tripping of said working tool, one-way valve means having an intake side and a discharge side located in said fluid passage means between said pumping means and said hydraulic cylinder, said valve means permitting fluid flow from said pumping means to said hydraulic cylinder but preventing flow from said hydraulic cylinder to said fluid pumping means and wherein said pressure relief valve means communicates with said fluid passage between said one-way valve means and said hydraulic cylinder, and whereby said pressure responsive valve means restores the selected working pressure in said hydraulic cylinder upon loss of fluid to said reservoir through said pressure relief valve means.

2. The combination of a tractor having fluid pumping means and a fluid reservoir in communication with said pumping means, and an implement carrying an earth working tool with a hydraulic cylinder on said implement and connected to said working tool to afford tripping of said working tool upon increase in the draft pressure and resetting of the tool upon decrease in the draft pressure on the tool, a hydraulic circuit including fluid passage means connecting said fluid pumping means to said hydraulic cylinder, said means responsive to pressure in said fluid passage for controlling fluid flow and maintaining the preselected working pressure in said hydraulic cylinders comprises a solenoid operated valve in said fluid passage means, said valve being biased to a normally closed position, an adjustable pressure responsive electrical switch having a pilot conduit in communication with said fluid passage means and an electrical circuit connected to said switch to energize said solenoid and open said valve means as said switch closes responsive to a drop of pressure in said fluid passage means below a preselected level and whereby as said working pressure in said hydraulic cylinder is restored to said preselected level, said pressure responsive electrical switch will open and deenergize said solenoid, and pressure relief valve means connected to said fluid passage means, said pressure relief valve means communicating with said fluid reservoir to afford fluid flow into said reservoir and tripping of said working tool as the pressure in said hydraulic cylinder increases and attains a predetermined level upon tripping of said working tool.

3. The combination of a tractor having fluid pumping means and a fluid reservoir in communication with said pumping means, and an implement carrying an earth working tool with a hydraulic cylinder on said implement and connected to said working tool to afford tripping of said working tool upon increase in the draft pressure and resetting of the tool upon decrease in the draft pressure on said tool, a hydraulic circuit including fluid passage means connecting said fluid pumping means to said hydraulic cylinder, one-way valve means in said fluid passage means, a pressure responsive unloading valve having inlet, outlet and pilot ports, a conduit connecting said fluid passage means with said inlet of said unloading valve, a bypass conduit connecting said outlet of said unloading valve with said fluid reservoir, a pilot conduit connecting said pilot port with said fluid passage means on the discharge side of said one-way valve means and said unloading valve being in a normally closed position until the pressure in said fluid passage means attains the selected working pressure and opens said unloading valve thereby providing fluid communication between said inlet and outlet of said unloading valve and fluid communication between said fluid passage means and said fluid reservoir for continuous flow therethrough to bypass said hydraulic cylinder.

4. The combination of a tractor having fluid pumping means and a fluid reservoir in communication with said pumping means, and an implement carrying an earth working tool with a hydraulic cylinder on said implement and connected to said working tool to afford tripping of said working tool upon increase in the draft pressure and resetting of the tool upon decrease in the draft pressure on the tool, a hydraulic circuit including fluid passage means connecting said fluid pumping means to said hydraulic cylinder, means responsive to pressure in said fluid passage for controlling fluid flow through said passage to maintain a selected working pressure in said hydraulic cylinder, and pressure relief valve means connected to said fluid passage means, said pressure relief valve means communicating with said fluid reservoir to afford fluid flow into said reservoir and tripping of said working tool as the pressure in said hydraulic cylinder increases and attains a predetermined level upon tripping of said working tool, and whereby said means responsive to said pressure in said fluid passage will restore the selected working pressure in said hydraulic cylinder upon loss of fluid to said reservoir, one-way valve means having an intake side and a discharge side located in said fluid passage means between said pumping means and said hydraulic cylinder, said valve means permitting fluid flow from said pumping means to said hydraulic cylinder but preventing flow from said hydraulic cylinder to said fluid pumping means and wherein said pressure relief valve means communicates with said fluid passage between said one-way valve means and said hydraulic cylinder, fluid accumulator means and a first conduit connecting said fluid accumulator means to said fluid passage means on the intake side of said one-way valve means and a second conduit connecting said fluid accumulator to the discharge side of said one-way valve means, first valve means in said first conduit, second valve means in said second conduit, and means for selectively opening and closing said first and second valve means.

5. The device of claim 4 wherein said first valve is biased to a normally closed position and said second valve is biased to a normally open position and said means for selectively opening and closing said first and second valve means includes solenoid coils for actuating said valves and a circuit with switch means for energizing said solenoid coils to open said first valve and close said second valve.

6. In combination, a tractor having fluid pumping means a fluid reservoir in communication with said pumping means, an implement having a hydraulic cylinder connected to a working tool carried by said implement, said hydraulic cylinder affording tripping to an inoperative position and resetting of said working tool to an operative position, fluid passage means connecting said fluid pumping means with said hydraulic cylinder on said implement, fluid flow restrictor means in said fluid passage between said pump and said cylinder to afford greater resistance to fluid flow from said pump to said cylinder than to fluid flow from said cylinder to retard movement of said working tool to its operative position from its tripped position, and pressure relief valve means connected to and in communication with said fluid passage means and said reservoir, said pressure relief valve means affording communication of said fluid passage with said reservoir when said pressure in said hydraulic cylinder attains a predetermined level to afford tripping of said working tool to an inoperative position.

7. The combination of a tractor having fluid pumping means and a fluid reservoir in communication with said pumping means, and an implement carrying an earth working tool with a hydraulic cylinder connected to said implement and said working tool to afford tripping of said working tool from its operative position upon increase in the draft pressure and to afford resetting of the tool upon decrease in the draft pressure on the tool, a hydraulic circuit including fluid passage means connecting said fluid pumping means to said hydraulic cylinder, fluid flow restrictor means in said fluid passage means adjacent said hydraulic cylinder, said fluid restrictor means affording greater resistance to flow toward said hydraulic cylinder than from said cylinder to minimize loading forces acting on said hydraulic cylinder and said working tool when said working tool is returned from the tripped position to the operative position.

8. The combination of a tractor having fluid pumping means and a fluid reservoir in communication with said pumping means, and an implement carrying an earth working tool with a hydraulic cylinder connected to said implement and said working tool to afford tripping of said working tool from its operative position upon increase in the draft pressure and to afford resetting of the tool upon decrease in the draft pressure on the tool, a hydraulic circuit including fluid passage means connecting said fluid pumping means to said hydraulic cylinder, said hydraulic cylinder having an air inlet and fluid restrictor means connected to said inlet to afford greater resistance to air flow from said hydraulic cylinder than into said cylinder to minimize loading forces acting on said hydraulic cylinder and said working tool when said working tool is returned to the operative position from the tripped position.

9. In the combination of a tractor having fluid pumping means and an implement having a frame with earth working tools, and means for connecting said earth working tools to said frame, and a hydraulic circuit including hydraulic cylinders on said implement, said cylinders being connected to said working tools to afford tripping of said working tools upon increase in pressure on said working tools and resetting of the tools to their operative position upon decrease in the pressure on said tools, the improvement comprising fluid flow restrictor means in said hydraulic circuit, said fluid flow restrictor means affording greater resistance to fluid flow into said hydraulic cylinder than from said cylinder to retard movement of said working tools to their operative position from a tripped position.

10. The combination of claim 9 wherein said hydraulic circuit includes a manifold line and passage means connecting said manifold line to each of said hydraulic cylinders and wherein said fluid flow restrictor means is in each of said passage means connecting said manifold to each of said cylinders, said flow restrictor means preventing a surge of pressure in said cylinders upon sequential tripping of said working tools to prevent rapid return of said tripped working tools to their operative position.

11. The combination of an agricultural implement having a frame and a plurality of working tools, means connecting said working tools to said frame to afford tripping of the working tools upon encountering an obstacle, hydraulic cylinders, each of said hydraulic cylinders having one end connected to the working tool and the other end connected to said frame, a manifold line adapted to be connected to a hydraulic circuit on a tractor, means for connecting said manifold line to each of said hydraulic cylinders, and fluid restrictor means in said means connecting said manifold to each of said cylinders, said restrictor means affording tripping of the working tool at a first rate to clear the obstacle and affording resetting of said working tool to its operative position at a second rate, said second rate being lower than said first rate to minimize shock loads on said working tool and said frame.

12. The combination of fluid pumping means and an agricultural implement comprising a frame, a plurality of working tools pivotally connected to said frame for movement between an earth engaging position and a retracted tripped position, a hydraulic cylinder connected to each of said working tools and to said frame, a fluid passage connected to said fluid pumping means and to said hydraulic cylinders to afford fluid communication between said pumping means and said cylinders, each of said cylinders having flow restrictor means for affording substantially free fluid flow from each of said cylinders upon tripping of said working tools and a limited rate of flow into said cylinders whereby the flow restrictor means prevents a sudden rise in pressure in one of said cylinders upon tripping of other of said working tools.

13. The device of claim 12, including means responsive to pressure in said fluid passage for controlling fluid flow through said passage to said cylinders to maintain a selected working pressure in said hydraulic cylinders and to restore the selected working pressure upon tripping of said tools.